United States Patent
Kim et al.

(10) Patent No.: US 10,057,027 B2
(45) Date of Patent: Aug. 21, 2018

(54) METHOD AND APPARATUS FOR RECEIVING REFERENCE SIGNAL

(71) Applicant: Electronics and Telecommunications Research Institute, Daejeon (KR)

(72) Inventors: Cheulsoon Kim, Daejeon (KR); Gi Yoon Park, Daejeon (KR); Wooram Shin, Daejeon (KR); Sung-Hyun Moon, Daejeon (KR); Young Jo Ko, Daejeon (KR); Junyoung Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 15/149,869

(22) Filed: May 9, 2016

(65) Prior Publication Data

US 2016/0330004 A1    Nov. 10, 2016

(30) Foreign Application Priority Data

| May 7, 2015 | (KR) | 10-2015-0064059 |
| May 28, 2015 | (KR) | 10-2015-0074671 |
| Jun. 9, 2015 | (KR) | 10-2015-0081337 |
| Jul. 8, 2015 | (KR) | 10-2015-0097117 |
| May 4, 2016 | (KR) | 10-2016-0055565 |

(51) Int. Cl.
*H04L 5/00*    (2006.01)

(52) U.S. Cl.
CPC .................. *H04L 5/0048* (2013.01)

(58) Field of Classification Search
CPC .......... H04W 72/1268; H04W 72/042; H04W 72/14; H04W 72/1273; H04L 5/0048; H04L 5/0035; H04L 5/0053; H04B 7/0626

See application file for complete search history.

(56) References Cited

U.S. PATENT DOCUMENTS

| 2010/0075672 | A1 | 3/2010 | Jwa et al. | |
| 2013/0083753 | A1* | 4/2013 | Lee | H04W 72/0453 370/329 |
| 2013/0286964 | A1 | 10/2013 | Chu | |
| 2015/0078284 | A1 | 3/2015 | Lee et al. | |
| 2015/0163008 | A1 | 6/2015 | Kim et al. | |
| 2015/0263796 | A1* | 9/2015 | Nam | H04B 7/0417 370/329 |
| 2015/0365209 | A1* | 12/2015 | Yi | H04L 5/001 370/329 |
| 2016/0135194 | A1* | 5/2016 | Kim | H04B 7/0626 370/329 |

FOREIGN PATENT DOCUMENTS

| KR | 101001015 B1 | 12/2010 |
| KR | 1020150009956 A | 1/2015 |
| KR | 1020150066996 A | 6/2015 |
| WO | 2014062195 A1 | 4/2014 |

* cited by examiner

*Primary Examiner* — Chandrahas B Patel
(74) *Attorney, Agent, or Firm* — William Park & Associates Ltd.

(57) ABSTRACT

A method for receiving a reference signal including receiving a configuration about a subband from the base station through a higher layer signaling, wherein the RS is allocated to the subband; and receiving a subframe including a reference signal resource allocated by a unit of the subband, and an apparatus are provided.

17 Claims, 11 Drawing Sheets

METHOD AND APPARATUS FOR RECEIVING REFERENCE SIGNAL

CROSS-REFERENCE TO RELATED APPLICATION

This application claims priority to and the benefit of Korean Patent Application Nos. 10-2015-0064059, 10-2015-0074671, 10-2015-0081337, 10-2015-0097117, and 10-2016-0055565 filed in the Korean Intellectual Property Office on May 7, 2015, May 28, 2015, Jun. 9, 2015, Jul. 8, 2015, and May 4, 2016, the entire contents of which are incorporated herein by reference.

BACKGROUND OF THE INVENTION (a) Field of the Invention

The present description relates to a method and apparatus for receiving a reference signal in a mobile communication system.

(b) Description of the Related Art

A downlink reference signal (RS) of LTE (long term evolution) system includes Cell specific RS (CRS), User Equipment RS (UE-RS), positioning RS (PRS), and channel state information-RS (CSI-RS). Because the UE-RS is transmitted as UE-specific physical downlink shared channel (PDSCH), the UE-RS exists in a physical resource block (PRB) included in downlink bandwidth allocated to terminal through downlink grant (DL grant), not in the remaining of PRB pair that are not indicated in the DL grant. The rest of downlink RS (CRS, PRS, CSI-RS) is transmitted periodically on the entire PRB pairs included in the system bandwidth. Then, the terminal may obtain CSI (that is, precoding matrix indicator (PMI)/rank indicator (RI)/channel quality indicator (CQI)/CSI-RS resource indicator (CRI)/Precoding matrix type indicator (PTI)) using the CSI-RS on the CSI reference resource defined by the LTE specification. Afterwards the obtained CSI by the terminal from the CSI-RS may be reported according to the CSI reporting mode defined by the LTE specification.

SUMMARY OF THE INVENTION

An exemplary embodiment provides a method for receiving a reference signal (RS) from a base station by a terminal. The receiving method includes: receiving a configuration about a subband from the base station through a higher layer signaling, wherein the RS is allocated to the subband; and receiving a subframe including a reference signal resource allocated by the unit of a subband, wherein the RS is one of a user equipment-reference signal (UE-RS) or a channel state information-reference signal (CSI-RS).

The subband may include at least one zero power (ZP) CSI-RS resource and at least one non-zero power (NZP) CSI-RS resource when the RS is the CSI-RS.

The method may further include: receiving information about the subband through the higher layer signaling, wherein the information about the subband is an index of the subband to which the NZP CSI-RS resource is allocated.

The method may further include: receiving information about the subband through a downlink control information (DCI), wherein the information about the subband is an index of the subband to which the NZP CSI-RS resource is allocated.

The method may further include: receiving an NZP CSI-RS on the NZP CSI-RS resource; generating a CSI report based on the NZP CSI-RS; and transmitting the CSI report to the base station using an uplink resource indicated by an uplink grant (UL grant).

The UL grant may include a CSI trigger for the CSI report.

The method may further include: receiving a downlink grant (DL grant) including a physical downlink shared channel (PDSCH) scheduling information for a rate matching of the PDSCH; and performing the rate matching in consideration of a location of a resource element (RE) used by the NZP CSI-RS.

The method may further include: performing a rate matching for an enhanced physical downlink control channel (EPDCCH) based on the subframe when the base station performs a rate matching on a resource block in which the EPDCCH is transmitted.

Another exemplary embodiment provides a method for rate matching for a physical downlink shared channel (PDSCH) by a terminal. The rate matching method includes: receiving a configuration about a PDSCH resource element (RE) mapping and quasi-co-location indicator (PQI) field at which a location of a reference signal (RS) is considered; and performing the rate matching based on the PQI field.

The performing of the rate matching may include performing the rate matching in the same manner for an entire resource block (RB) to which the PDSCH is allocated.

The method may further include: receiving a downlink grant (DL grant) including a scheduling information for the PDSCH, wherein the performing of the rate matching comprises performing the rate matching based on the scheduling information and the PQI field.

Yet another exemplary embodiment provides a terminal including: at least one processor; a memory; and a radio frequency unit, wherein the at least one processor executes at least one program stored in the memory to perform, receiving a configuration about a subband from a base station through a higher layer signaling, wherein a reference signal (RS) is allocated to the subband; and receiving a subframe including a reference signal resource allocated by a unit of the subband, wherein the RS is one of a user equipment-reference signal (UE-RS) or a channel state information-reference signal (CSI-RS).

The subband may include at least one zero power (ZP) CSI-RS resource and at least one non-zero power (NZP) CSI-RS resource when the RS is the CSI-RS.

The at least one processor may further perform receiving information about the subband through the higher layer signaling, wherein the information about the subband is an index of the subband to which the NZP CSI-RS resource is allocated.

The at least one processor may further perform receiving information about the subband through a downlink control information (DCI), wherein the information about the subband is an index of the subband to which the NZP CSI-RS resource is allocated. The at least one processor may further perform: receiving an NZP CSI-RS on the NZP CSI-RS resource; generating a CSI report based on the NZP CSI-RS; and transmitting the CSI report to the base station using an uplink resource indicated by an uplink grant (UL grant).

The UL grant may include a CSI trigger for the CSI report.

The at least one processor may further perform: receiving a downlink grant (DL grant) including a physical downlink shared channel (PDSCH) scheduling information for a rate matching of the PDSCH; and performing the rate matching in consideration of a location of resource element (RE) used by the NZP CSI-RS.

The at least one processor may further perform performing a rate matching for an enhanced physical downlink control channel (EPDCCH) based on the subframe when the base station performs a rate matching on a resource block in which the EPDCCH is transmitted.

DETAILED DESCRIPTION OF THE EMBODIMENTS

Figure 1:
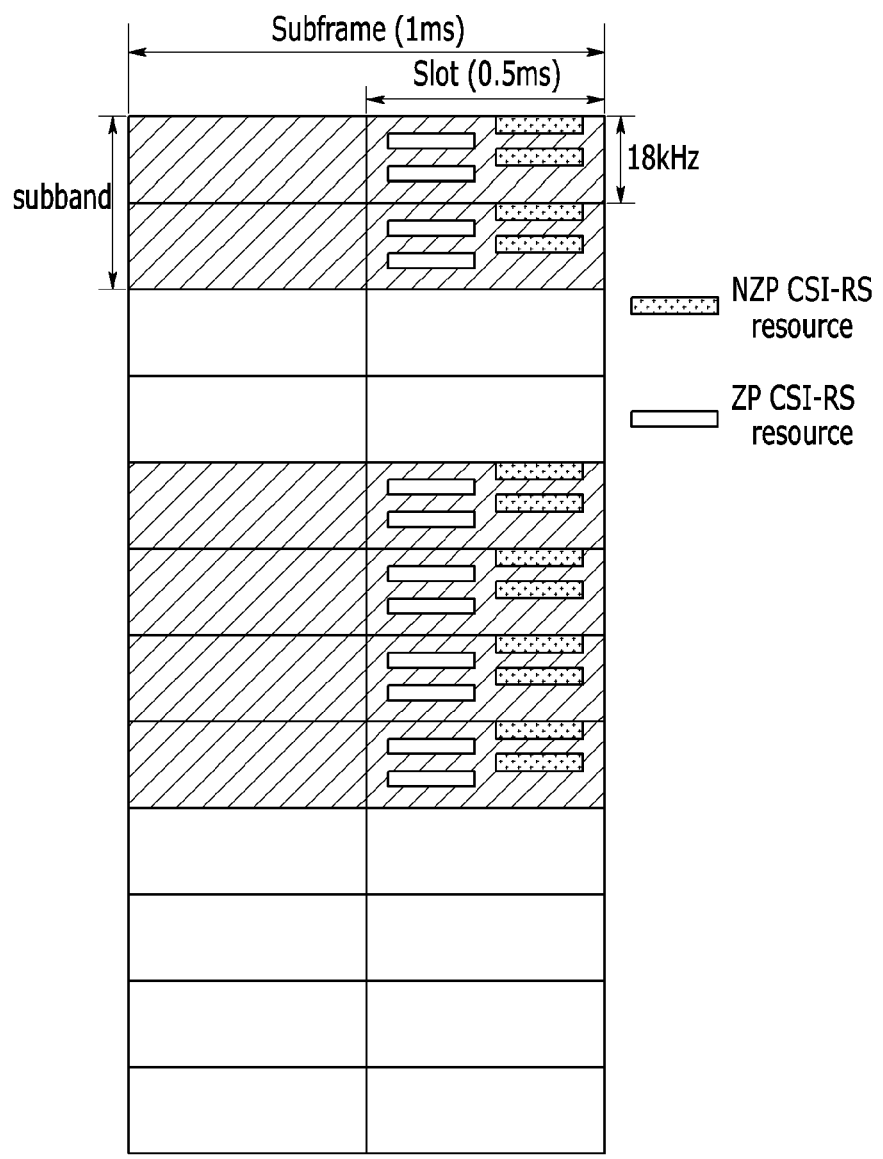
FIG. 1 is a schematic diagram illustrating CSI-RS resource allocated to a subband according to an exemplary embodiment.

Hereinafter, exemplary embodiments of the present invention will be described in detail with reference to the accompanying drawings so that those skilled in the art may easily practice the present invention. However, the present invention may be implemented in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Throughout the specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include functions of all or some of the MT, MS, AMS, HR-MS, SS, PSS, AT, UE, and the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto base station (BS), a home node B (HNB), a home eNodeB (HeNB), a pico BS, a macro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, and the like.

FIG. 1 is a schematic diagram illustrating CSI-RS resource allocated to a subband according to an exemplary embodiment.

Because the CQI is obtained for a higher layer-configured subband in a CSI reporting mode 3-0, 3-1, and 3-2 through a physical uplink shared channel (PUSCH) in the LTE system, the terminal obtains the CQI and the PMI for each subband, respectively. In a CSI reporting mode 1-2, the terminal obtains the CQI for an entire subband (wideband CQI) and obtains the PMI for each subband (per-subband PMI). On the other hand, in a PUSCH CSI reporting mode 2-0 and 2-2, the terminal may reduce a CSI payload by control the size of the M because the terminal obtains the CQI for the M subband (best M subband) which is selected by the terminal (UE-selected subband).

In the PUSCH CSI reporting mode 2-0 and 2-2 in the LTE system, the terminal may obtain the CSI for the wideband by assuming a periodic CSI-RS. However, CSI-RS resources according to the exemplary embodiment do not exist in the entire subband but exist in a specific subband. For example, the terminal receives a non-zero power (NZP) CSI-RS and a zero power (ZP) CSI-RS for the specific subband of the subbands included in the wideband. When the CSI-RS is only transmitted in the specific subband, the payload of the CSI-RS transmission may be reduced because the terminal performs the PUSCH CSI reporting for the specific subband.

According to the exemplary embodiment, one subband and one subframe may include four RBs, and one RB may include at least one NZP CSI-RS resource and at least one ZP CSI-RS resource. Referring to FIG. 1, the size of the subband is 360 kHz (180 kHz×2) along the x axis. The RB located in the right slot of each subband includes the NZP CSI-RS resource and the ZP CSI-RS. Referring to FIG. 1, the shaded section indicates the subband which includes the NZP CSI-RS resource and the ZP CSI-RS resource. A number of the NZP CSI-RS resource and the ZP CSI-RS included in each RB is 2, and the NZP CSI-RS and the ZP CSI-RS use a different resource element (RE).

Meanwhile, in order to independently transmit the UE-specific CSI-RS utilized in a multi-input multi-output (MIMO) system, the NZP CSI-RS may be transmitted as many as the number of the terminal. When the NZP CSI-RS is transmitted as many as the number of the terminal, the number of the RE used for the transmission of the PDSCH is decreased. Therefore, it is needed that the plurality of terminals is grouped appropriately. Even if the group-specific CSI-RS replaces UE-specific CSI-RS, the CQI mismatch may be decreased when the metric used in the grouping of the terminal is well defined in the implementation aspects.

According to another exemplary embodiment, the multiplexing order may be raised compared to the existing wideband transmission by allocating the NZP/ZP CSI-RS resource by the unit of the subband in order to transmit the UE-specific CSI-RS. In this instance, the subband may be a basic unit of feedback of the LTE specification or a group of the continuous RBs or a group of the discontinuous RBs. When the subband is based on the LTE specification, the size of the subband may be determined as k according to the downlink system bandwidth of the LTE CSI reporting mode.

Table 1 expresses a method for transmitting the CSI-RS. In the case 1-1, a serving BS may transmit the CSI-RS periodically in the wideband. In the case 1-2, the serving BS may transmit the CSI-RS periodically in a specific subband. In the case 1-3, 1-4-1, and 1-4-2, the serving BS may transmit the CSI-RS aperiodically. Then, the serving BS may transmit the CSI-RS in the wideband in the case 1-3, and the serving BS may transmit the CSI-RS in the specific subband in the case 1-4 (1-4-1 and 1-4-2). According to the exemplary embodiment, the aperiodic CSI-RS transmission may imply a trigger of the CSI-RS transmission. In order to transmit a subband indication, a higher layer signaling may be used in the case 1-2 and 1-4-1, and a physical layer (PHY) signaling may be used in the case 1-4-2.

TABLE 1

|  | Subband | | |
| --- | --- | --- | --- |
|  | Wideband | Higher layer configured | PHY configured |
| Periodic | case 1-1 | case 1-2 | N/A |
| Aperiodic (triggering) | case 1-3 | case 1-4-1 | case 1-4-2 |

And, in order to raise multiplexing capabilities of the CSI-RS, the subband transmission of the CSI-RS may be considered (case 1-2 and case 1-4). In order to support the case 1-2, 1-4-1, and 1-4-2, a CSI reporting may be performed in a specific subband on the frequency axis.

According to the exemplary embodiment, the serving BS may restrict the measurement of the terminal through the higher layer signaling (for example, a radio resource control (RRC) signaling) so that the terminal measures the CSI in a single subframe. In this instance, the CSI reference resource may be included in the subframe.

When the CSI reference resource exists in the specific subband, the serving BS may transmit a downlink data by restricting the scheduling within the subband in which the CSI reference resource exists. In this instance, all or some CSI-RS resource configuration information (for example, a number of the CSI-RS port, a resource index of the NZP CSI-RS, a resource index of the ZP CSI-RS, a resource index of the CSI-IM, and so on) may be delivered to the terminal through the higher layer signaling or a downlink control information (DCI).

When the subband transmission of the CSI-RS is supported (for example, case 1-2 and 1-4), the subband CSI-RS resource may be allocated according to the subband configuration. When the serving BS serves a first terminal and a second terminal, the serving BS may indicate the subband including the CSI-RS resources to the first terminal by using a subband configuration method 1 or a subband configuration method 2 described in the following. After that, the first terminal may restrict the range of the CSI reference resource by the configured subband. In this instance, aside from the CSI report for the periodic CSI-RS, the first terminal may generate the CSI report for the configured subband. The second terminal performs rate matching for the PDSCH and enhanced physical downlink control channel (EPDCCH) received from the serving BS.

In the following detailed description, the subband configuration method 1 and the subband configuration method 2 have been described by using FIG. 2 and FIG. 3.

Figure 2:
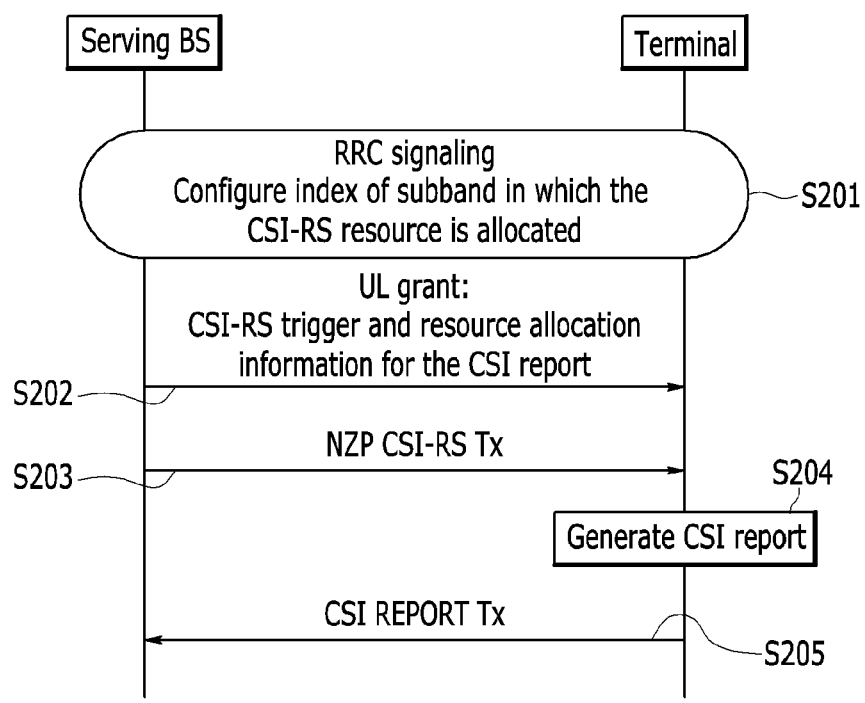
FIG. 2 is a flowchart illustrating subband configuration method according to an exemplary embodiment.

FIG. 2 is a flowchart illustrating subband configuration method according to an exemplary embodiment.

In a subband configuration method (hereinafter "method 1", and corresponding to the case 1-2 and 1-4-1) according to an exemplary embodiment, an index of the subband in which the CSI-RS resource is allocated may configured through the RRC signaling. In this instance, the rest of the CSI-RS configuration parameters except the subband index, the period of the CSI-RS subframe, and the offset of the CSI-RS subframe may be delivered through the higher layer signaling. That is, information about the RB pairs including the CSI-RS RE may be delivered to the terminal through the higher layer signaling when the CSI-RS resource is configured.

In the method 1, because the location of the subband in which the NZP CSI-RS resource is located is not changed at the time flow, the serving BS transmits information about subband in which the ZP CSI-RS resource is allocated by using the higher layer signaling to all the terminals included in a cell. In this instance, the terminals served by the serving BS include a first terminal and the other terminals. The first terminal receives the NZP CSI-RS, but the other terminals do not receive the NZP CSI-RS. The other terminals include a second terminal receiving the PDSCH and a third terminal receiving the EPDCCH. The second terminal and the third terminal may perform an appropriate rate matching. The third terminal receives EPDCCH in a preconfigured subframe through the higher layer signaling, and does not demodulate a PDCCH in a subframe in which the EPDCCH is received. Therefore the third terminal cannot perform the rate matching of the EPDCCH dynamically.

In the following detailed description, the EPDCCH rate matching method of the serving BS and the third terminal is described.

A method B1: The serving BS performs rate matching in an RB in which the EPDCCH is transmitted regardless of the transmission of the NZP CSI-RS.

Because the index of the RB in which the NZP CSI-RS is transmitted already is indicated, the method B1 may be applied so that the third terminal assumes the existence of the NZP CSI-RS in the indicated RB. In this instance, unnecessary rate matching may occur because the serving BS performs the rate matching for the EPDCCH even if the NZP CSI-RS is not transmitted.

A method B2: Regardless of the transmission of the NZP CSI-RS, the serving BS does not perform the rate matching in the RB in which the EPDCCH is transmitted.

To resolve the problem of the method B1, the method B2 may be applied. In the method B2, the serving BS does not transmit the NZP CSI-RS in the RB in which the EPDCCH is transmitted. According to the LTE specification, because the serving BS does not transmit the EPDCCH and the PDSCH in a single RB, the first terminal need not to estimate the channel for the RB and the second terminal need not to perform the rate matching. The CSI reference resource may be allocated in RBs of set S subband except the RBs in which the EPDCCH is allocated.

In the following, an allocation method of the ZP CSI-RS is described in detail.

When the serving BS transmits the NZP CSI-RS through a plurality of subband NZP CSI-RS resources (that is, when the NZP CSI-RS is transmitted by using the plurality of subband), the ZP CSI-RS may be allocated by a unit of subband. A method 1-1 and a method 1-2 in the following are to reduce a higher layer signaling overhead that may occur in that case.

The method 1-1: The ZP CSI-RS resource is configured to the wideband. In the case 1-2, ZP CSI-RS is configured equal to the ZP CSI-RS configuration of the LTE specification. In the case 1-4-1, the wideband ZP CSI-RS resource is configured through the higher layer signaling. In this instance, the ZP CSI-RS resource is triggered by using a DL grant by which the PDSCH is allocated to the terminal, so that the terminal may recognize that the ZP CSI-RS resource is transmitted through the wideband. Therefore, the terminal may recognize that the ZP CSI-RS resource exists in an RB in which the PDSCH exists.

The method 1-2: The ZP CSI-RS resource is configured to the all subband in which the NZP CSI-RS resource is included. In this instance, the RE may be saved because the terminal is able to not muting unnecessarily in the subband in which the subband NZP CSI-RS resource is not included. In the case 1-2 (periodic subband CSI-RS transmission), the BS configures the ZP CSI-RS resource to all subband in which the NZP CSI-RS may be transmitted, and notifies the configuration of the ZP CSI-RS resource to the terminal through the higher layer signaling. In the case 1-4-1 (aperiodic subband CSI-RS transmission), the BS configures the ZP CSI-RS resource to all subband in which the NZP CSI-RS may be allocated, and notifies the configuration of the ZP CSI-RS resource to the terminal through the higher layer signaling. And then, the ZP CSI-RS resource is triggered by using a DL grant which is to allocate the PDSCH to the terminal, so that the terminal may recognize that the ZP CSI-RS resource is transmitted through the subband. Therefore, the terminal may recognize that the ZP CSI-RS resource exists in an RB in which the PDSCH exists.

In the following, a PDSCH rate matching method is described in detail. A method A1 and a method A2 in the following is to indicate the rate matching to the second terminal. In this instance, the NZP CSI-RS may be transmitted in a DL subframe n–m (i.e., m-th of the previous subframe from subframe n).

Figure 3:
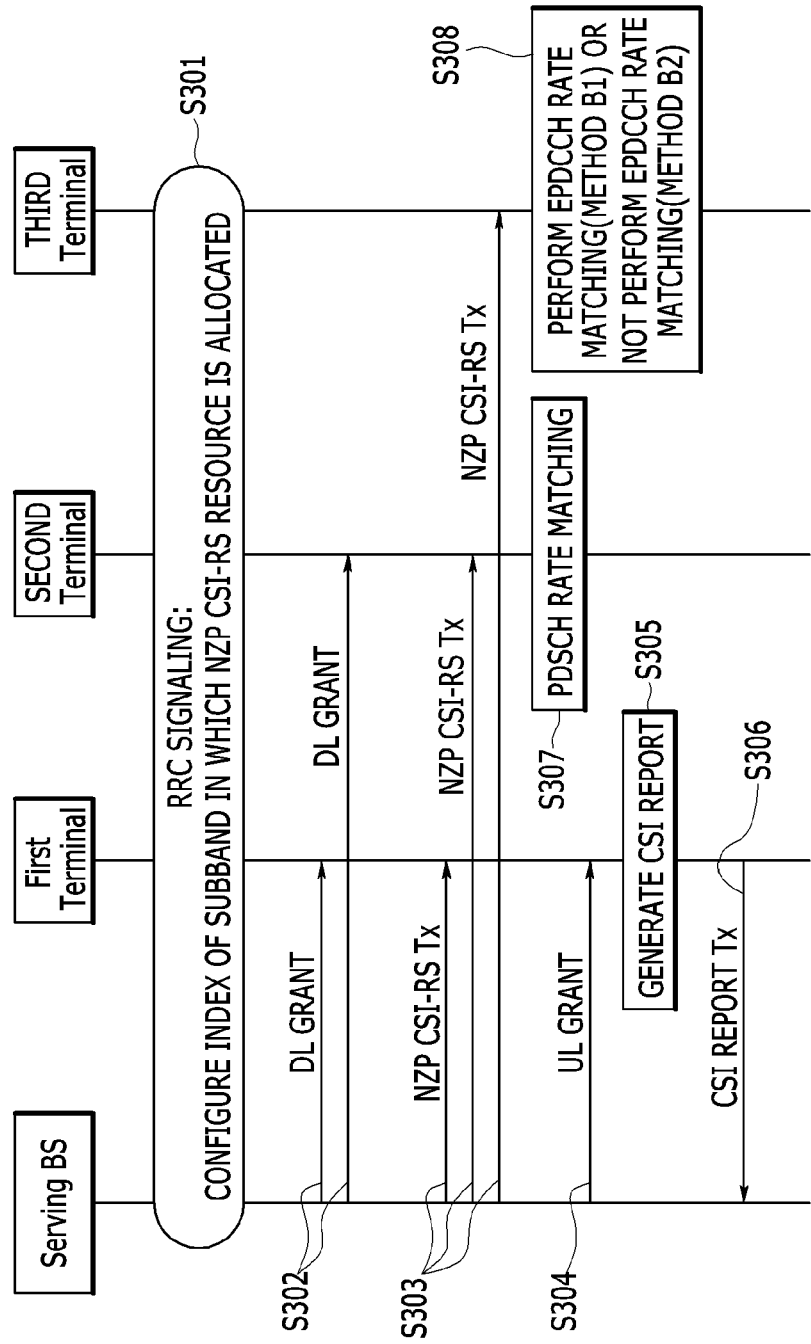
FIG. 3 is a flowchart illustrating a first rate matching method according to an exemplary embodiment.

FIG. 3 is a flowchart illustrating a first rate matching method according to an exemplary embodiment.

In a method A1, the existence of the NZP CSI-RS is indicated to the first terminal and the second terminal. The serving BS transmits information about the subband in which the NZP CSI-RS is allocated to the first terminal and the second terminal through the higher layer signaling (S301). When the method B1 is applied to the third terminal, the serving BS transmits information about the subband in which the NZP CSI-RS is allocated to the third terminal through the higher layer signaling (S301-1). In this instance, the information about the subband in which the NZP CSI-RS is allocated includes an index of the subband in which the NZP CSI-RS is allocated.

The serving BS notifies the transmission of the NZP CSI-RS to the first terminal and the second terminal through the DL grant in a DL subframe n–k in order to transmit the NZP CSI-RS (S302). In this instance, the transmission notice of the NZP CSI-RS may be transmitted through a DCI transmitted by the serving BS in a cell-specific search space (CSS). For example, for the transmission notice of the NZP CSI-RS, 1 bit may be added to the DCI format 10.

Meanwhile, the second terminal receives a scheduling information of the PDSCH in a DL subframe n–m through a DCI transmitted by the serving BS in a UE-specific search space (USS) (S303). That is, the second terminal receives 2 DL grants in the same subframe, and then the 2 DL grants include a DL grant including the DCI for the transmission of the NZP CSI-RS and a DL grant including the scheduling information of the PDSCH for the rate matching. On the other hand, the third terminal needs not to receive the DCI including the transmission notice of the NZP CSI-RS.

After that, the NZP CSI-RS is transmitted in the DL subframe n–m (S304). Here, the m may be the k (m=k).

The serving BS transmits a UL grant so that the first terminal transmits a CSI report in a UL subframe n (S305).

And then, the first terminal generates the CSI report based on the received NZP CSI-RS (S306). In this instance, the UL grant is transmitted in a DL subframe n–j, and includes a CSI trigger for the CSI report and information of a PUSCH resource to be used for the CSI. In a LTE frequency division duplex (FDD) system, j is 4 (j=4), and in a LTE time division duplex (TDD) system, j has a value determined by the specification. The first terminal transmits the CSI report according to the UL grant by using the PUSCH in a UL subframe n (S307).

The second terminal performs the PDCSH rate matching in consideration of the location of the RE used by the NZP CSI-RS in the DL subframe n–m (S308). Because the second terminal performs the PDSCH rate matching in the specific subband, so it is corresponding to the method 1-2.

When the method B1 is applied to the third terminal, the third terminal does not receive the DCI indicating the transmission of the NZP CSI-RS but performs the EPDCCH rate matching for the subband in which the NZP CSI-RS resource is allocated, wherein the subband is notified through the higher layer signaling. When the method B2 is applied to the third terminal, the third terminal does not perform the rate matching (S309).

Figure 4:
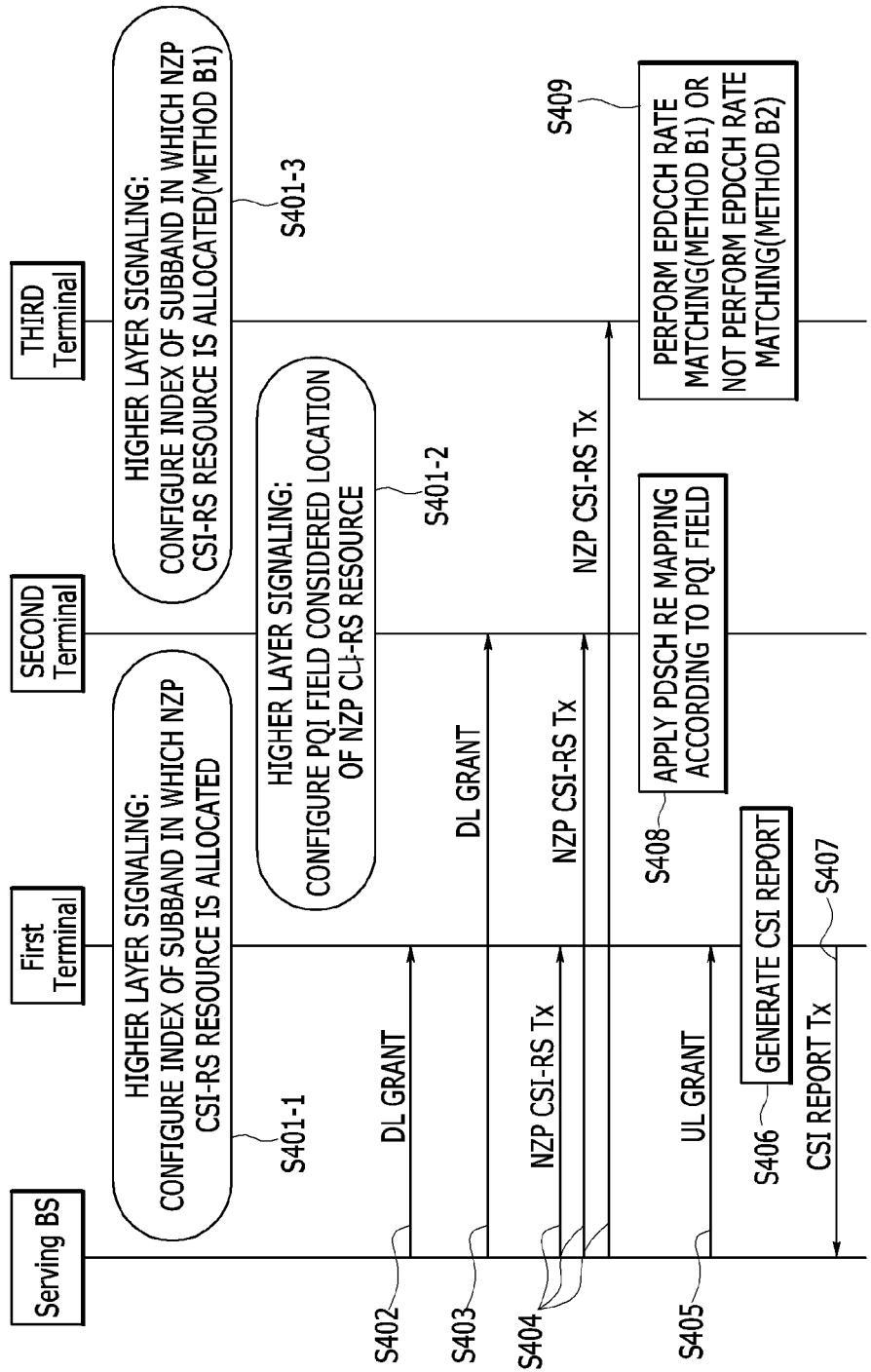
FIG. 4 is a flowchart illustrating a second rate matching method according to an exemplary embodiment.

FIG. 4 is a flowchart illustrating a second rate matching method according to an exemplary embodiment.

In a method A2, the existence of the NZP CSI-RS is not indicated to the second terminal but is indicated to the first terminal. Instead, a PDSCH RE mapping and Quasi-Co-Location indicator (PQI) field is used for the second terminal.

The serving BS transmits information about the subband in which the NZP CSI-RS is allocated to the first terminal through the higher layer signaling (S401-1).

And, the serving BS configures a value of the PQI field through the higher layer signaling in consideration of the location of the NZP CSI-RS resource (S401-2). In this instance, the PQI field and the RRC parameter related to the PQI field may be based on the LTE specification. When the PQI field is used, the second terminal does not perform the PDSCH rate matching in a different manner for each RB. However, the second terminal performs the PDSCH rate matching in a same manner for all RBs in which the PDSCH is allocated, so, it is corresponding to the method 1-1.

When the method B1 is applied to the third terminal, the serving BS transmits information about the subband in which the NZP CSI-RS is allocated to the third terminal through the higher layer signaling (S401-3). In this instance, the information about the subband in which the NZP CSI-RS is allocated includes the index of the subband in which the NZP CSI-RS is allocated.

The serving BS notifies the transmission of the NZP CSI-RS to the first terminal through the DL grant in a DL subframe n–k in order to transmit the NZP CSI-RS (S402). Such transmission notice of the NZP CSI-RS may be transmitted through a DCI transmitted by the serving BS in a USS. For example, 1 bit may be added to the DCI format 1/1A/1B/1C/1D/2A/2B/2C/2D for the transmission notice of the NZP CSI-RS. Then, the second terminal receives a PDSCH scheduling information in a DL subframe n-m through a DCI transmitted by the serving BS in the USS (S403). In this instance, the received DL grant including the PDSCH scheduling information is for the rate matching. Meanwhile, the third terminal needs not to receive such DCI.

And then, the NZP CSI-RS is transmitted in a DL subframe n–m (S404). Here, the m may be the k (m=k). The serving BS transmits a UL grant so that the first terminal performs the CSI report in a UL subframe n (S405). The first terminal that receives the UL grant receives the NZP CSI-RS to generate the CSI report (S406). In this instance, the UL grant is transmitted in a DL subframe n−j, and includes a CSI trigger and information about a PUSCH resource to be used for the CSI report by the first terminal. In a LTE frequency division duplex (FDD) system, j is 4 (j=4), and in a LTE time division duplex (TDD) system, j has a value determined by the specification. The first terminal transmits the CSI report according to the UL grant by using the PUSCH in a UL subframe n (S407).

The second terminal performs the rate matching in the DL subframe n−m by using the PQI field and the PDSCH scheduling information (S408). Because the second terminal can discover REs in which the PDSCH is allocated, the second terminal may perform the PDSCH rate matching regardless of the location of the NZP CSI-RS resource.

When the method B1 is applied to the third terminal, the third terminal does not receive the DCI that notifies the transmission of the NZP CSI-RS, and performs an EPDCCH rate matching for the subband in which the NZP CSI-RS resource is allocated (S409). When the method B2 is applied to the third terminal, the third terminal does not perform the rate matching.

In the method A1 and the method A2, the descriptions for the first terminal, the second terminal, and the third terminal are separate, but the serving BS may configure one operation for a terminal among the first terminal operation, the second terminal operation, or the third terminal operation.

In the method A1 and the method A2, the DL grant transmitted in a DL subframe n−k and the UL grant transmitted in a DL subframe n−j are described respectively, but the DL grant and the UL grant may be processed as one UL grant. That is, the method A1 and the method A2 may be performed without the DL grant. In this instance, serving BS indicates the CSI report trigger to the first terminal in a DL subframe n−j by using a UL grant. Then, the CSI report trigger analyzed by the first terminal means that the serving BS will transmit the CSI-RS resource pre-configured through the higher layer signaling, and the terminal should receive the CSI-RS to generate the CSI report. In addition, the CSI report trigger may indicate that the terminal uses the PUSCH which is assigned by in the UL grant, where the PUSCH carries the CSI report. The method A2 is applied to the terminal to perform the PDSCH rate matching according to the received PQI field value. In this instance, the method A1 cannot be applied to the second terminal because of the absence of the DL grant.

Figure 5:
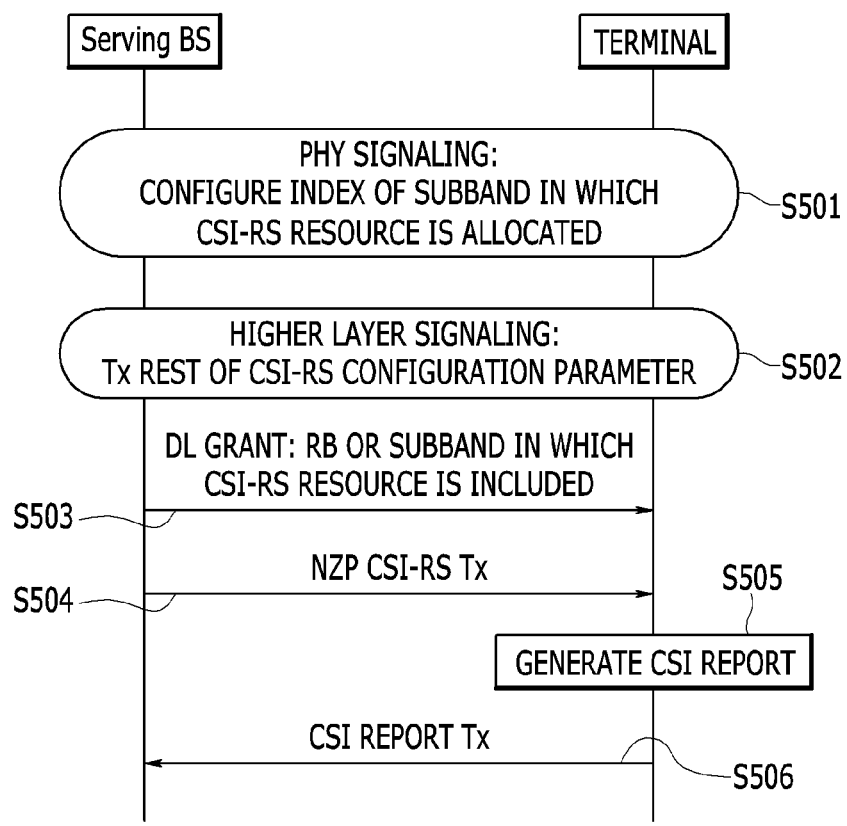
FIG. 5 is a flowchart illustrating a subband configuration method according to another exemplary embodiment.

FIG. 5 is a flowchart illustrating a subband configuration method according to another exemplary embodiment.

In a subband configuration method (hereinafter, "method 2", and corresponding to the case 1-4-2) according to another exemplary embodiment, an index of the subband in which the CSI-RS resource is allocated is delivered through the PHY signaling (S501). In this case, the rest of CSI-RS configuration parameters except the subband index are delivered through the higher layer signaling (S502). In this instance, the CSI-RS configuration parameters may not include at least a period of the CSI-RS and a subframe offset of the CSI-RS.

In the method 2, same procedures of the method 1 are performed, but a DL grant for transmission of the CSI-RS and information included in the DCI are different from each other.

In the method 2, information about the subband in which the CSI-RS is transmitted is delivered to the terminal through the DCI (S503). In the case 1-4-1, the information about the subband in which the CSI-RS is transmitted is delivered to the terminal through the higher layer configuration, but the information about the subband in which the CSI-RS is transmitted is delivered to the terminal through the PHY configuration.

Because the required DCI format at this time is not supported by the LTE specification, a new DCI format may be used or an extra DCI field may be added to the DCI format of the LTE specification. The added information may include at least information about the subband in which the CSI-RS RE is included through the new DCI field. The new DCI format may be mapped to the USS.

A bitmap may be used to indicate the subband in which the NZP CSI-RS is transmitted through the DCI. For example, the bitmap may correspond to an index of the RB including the CSI-RS. Or the bitmap may correspond to the subband definition defined by the CSI reporting node configured to the terminal which performs the CSI report. When a bit is allocated to each RB, more combinations of the RB may be expressed by using more DCI payload. Therefore, it is more economical that the bit is allocated by the unit of the subband.

The definition of the first terminal, the second terminal, and the third terminal used in the method 2 is same as in the method 1. The first terminal receives the NZP CSI-RS (S504) to perform the CSI report (S505, S506). The second terminal performs the PDSCH rate matching in consideration of the NZP CSI-RS while not performing the CSI report. The third terminal performs the EPDCCH rate matching while not performing the CSI report (method B1), or does not perform the EPDCCH rate matching (method B2). The method B1 and the method B2, which are applied to the method 2 are same with the method 1.

The EPDCCH rate matching in the method 2 is same as that of the method 1. The serving BS performs the higher layer signaling to the first terminal and the second terminal so that the subband in which the CSI-RS is transmitted does not overlap with the RB in which the EPDCCH is transmitted (method B2). Or the serving BS performs the higher layer signaling to the third terminal so that the rate matching is performed previously in all RBs that may overlap with the subband in which the CSI-RS is transmitted (method B1).

The PDSCH rate matching in the method 2 is same as that of the method 1. The second terminal in the method 2 performs the PDSCH rate matching by using the foregoing extra DCI field. The method 1-1 is about the PDSCH rate matching over the wideband, and the method 1-2 is about the PDSCH rate matching over the subband. In the method 2, information about the subband of the ZP CSI-RS configured to the second terminal by the serving BS may be received through the DCI by the second terminal. However, in the method 1, the information about the ZP CSI-RS subband may be notified in advance, and whether the ZP CSI-RS is transmitted may be notified through the DCI.

Figure 6:
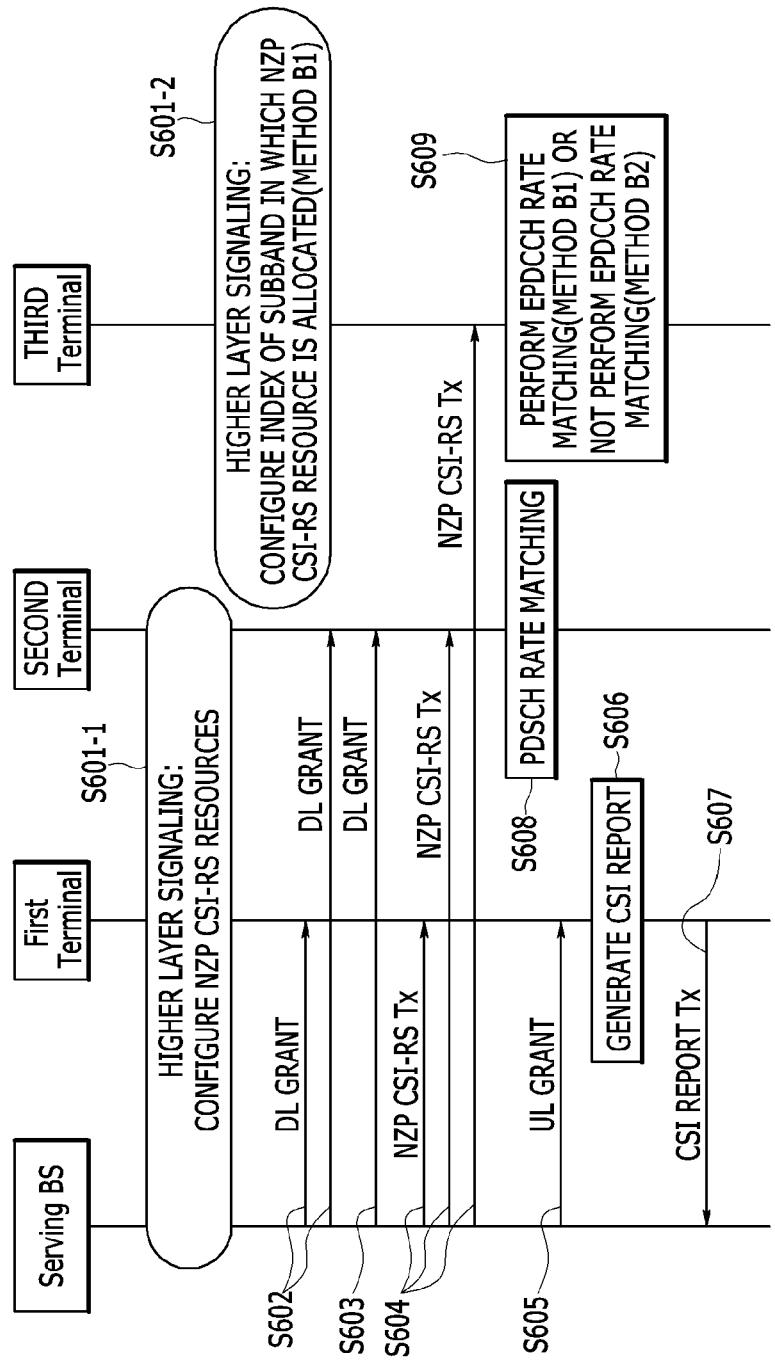
FIG. 6 is a flowchart illustrating a first rate matching method according to another exemplary embodiment.
Figure 7:
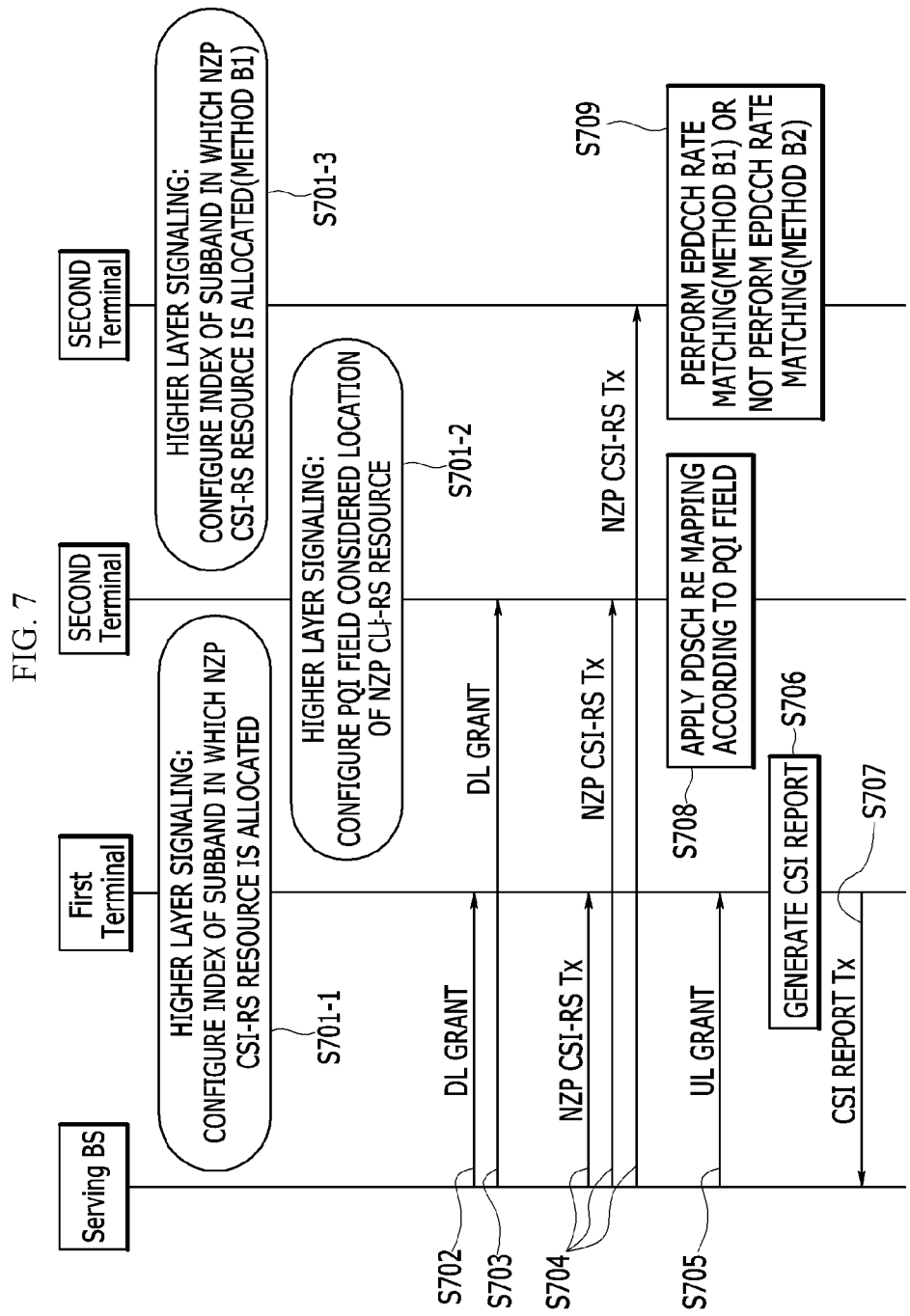
FIG. 7 is a flowchart illustrating a second rate matching method according to another exemplary embodiment.

FIG. 6 is a flowchart illustrating a first rate matching method according to another exemplary embodiment, and FIG. 7 is a flowchart illustrating a second rate matching method according to another exemplary embodiment.

The method 2 and the method 1-2 are applied to a first rate matching method according to another exemplary embodiment, and the method 2 and the method 1-2 are applied to a second rate matching method according to another exemplary embodiment.

In the FIG. 6, the first terminal transmitting the CSI report to the serving BS, the second terminal receiving the PDSCH from the serving BS, and the third terminal receiving the EPDCCH from the serving BS are considered. The first terminal and the second terminal receive a configuration about the NZP CSI-RS resource through the higher layer signaling (S601-1). In this instance, information about the subband in which the NZP CSI-RS resource is allocated is not delivered through the higher layer signaling. The first terminal and the second terminal receive information about the subband (for example, the subband index) in which the NZP CSI-RS resource is allocated through the DL grant in a later procedure. The third terminal in which the method B1 is applied receives the index of the subband in which the NZP CSI-RS resource is allocated to perform the EPDCCH rate matching through the higher layer signaling (S601-2).

Afterwards, the first terminal and the second terminal receive a DL grant including the subband index of the NZP CSI-RS (S602). The first terminal identifies the NZP CSI-RS resource, which is used for generation of the CSI report, from the received DL grant. The second terminal identifies the subband, which is used for performing the PDSCH rata matching, from the DL grant. And, the second terminal receives an additional DL grant (S603). In this instance, the additional DL grant received by the second terminal includes scheduling information of the PDSCH. Afterwards, the second terminal performs the PDSCH rate matching in the identified in S602, however the second terminal does not perform the PDSCH rate matching in the other subbands (S608).

The remaining procedures of FIG. 6 correspond to the procedures of FIG. 3. That is, S603, S604, S605, S606, S607, and S609 are identical to S303, S304, S305, S306, S307, and S309.

In the FIG. 7, the first terminal transmitting the CSI report to the serving BS, the second terminal receiving the PDSCH from the serving BS, and the third terminal receiving the EPDCCH from the serving BS are considered. The first terminal receives a configuration about the NZP CSI-RS resource through the higher layer signaling (S701-1). In this case, information about the subband in which the NZP CSI-RS resource is allocated is not delivered through the higher layer signaling. The first terminal may receive the information about the subband through the DL grant.

The second terminal receives, through the higher layer signaling, a configuration about the PQI field of which the location of the NZP CSI-RS resource is considered (S701-2). The third terminal in which the method B1 is applied, receives the index of the subband in which the NZP CSI-RS resource is allocated to perform the EPDCCH rate matching (S701-3).

Afterwards, the first terminal receives a DL grant including the index of the subband in which the NZP CSI-RS resource is allocated (S702). The first terminal identifies the NZP CSI-RS resource used for generation of the CSI report based on the received DL grant. The second terminal receives another DL grant different from the DL grant of the first terminal (S703), and performs the PDSCH rate matching based on the PQI field included in another DL grant (S708). The second terminal may perform the PDSCH rate matching regardless of the location of the NZP CSI-RS resource because the second terminal can be notified REs in which the PDSCH is allocated according to the PQI field.

The remaining procedures of FIG. 7 correspond to the procedures of FIG. 4. That is, S704, S705, S706, S707, and S709 is identical to S404, S405, S406, S407, and S409.

Meanwhile, another configuration method for plural subbands may be applied to the method 1 and the method 2, and the other value besides the bitmap may be used. When the plural subbands are configured discontinuously (for example, 3, 7, 11, . . . ), a start index of the subbands and a spacing may be indicated (for example, 3, 4). When the plural subbands are configured continuously (for example, 10, 11, 12, 13), the start index of the subbands and a size (that is, the length) may be indicated (for example, 10, 4). When plural subband clusters are configured discontinuously and each cluster includes continuously configured subbands (for example, 4, 5, 6, 16, 17, 18), a size of the subband cluster (that is, the length of the subband cluster), the start index of the subband, and the spacing (for example, 3, 4, 12) may be indicated.

A RE mapping of the subband CSI-RS and a sequence initialization are based on the CSI-RS resource allocation method of the existing LTE system. For example, a CSI-RS sequence is generated for the sequence initialization of the subband CSI-RS, and an element of the sequence corresponding to an RB is mapped to a CSI-RS RE. When the CSI-RS is configured by the unit of the subband, the middle portion of the CSI-RS sequence may be mapped to an RE. For example, when an RB index i is included in the subband, the 2i-th element and the 2i+1-th element of the sequence is mapped to the i-th RB. When the terminal transmits the CSI report according to the CSI request, the terminal transmits the PUSCH, which carries the subband CQI and the subband PMI, according to the CSI reporting mode to the serving BS. In this case, the terminal performs a channel coding for the RI, CQI, and PMI obtained by the subband, and maps the channel coded RI, CQI, and PMI to the RE of the PUSCH.

When the terminal estimates the wideband CQI, the wideband PMI, or the RI in a PUSCH CSI reporting mode, the terminal may estimate the CQI and PMI in an RB or a subband including the NZP CSI-RS resource. And, when the terminal estimates the subband CQI or the subband PMI in an arbitrary PUSCH CSI reporting mode, the terminal may estimate the subband CQI and the subband PMI in the indicated subband. In this instance, it is considered that the terminal can utilize the CSI-RS in the indicated subband. That is, the serving BS may minimize an unnecessary CSI-RS transmission by transmitting the CSI-RS in the indicated subband, and may reduce interference to the other terminal.

After the configuration of the CSI report is updated through the higher layer signaling or the DCI, the terminal measures signal part, interference part, and noise part by using a single DL subframe in the indicated subband, and does not recycle a measured result based on the former CSI-RS (for example, periodic CSI-RS). It may be corresponding to the case that the measurement restriction is not configured through the higher layer signaling.

And the subband CSI-RS resource may not be dropped in the subframe in which the system information block is transmitted unless the RBs do not overlap.

The serving BS configures the aperiodic CSI-RS transmission and the periodic CSI-RS transmission to the terminal through the higher layer signaling, separately. Therefore, the CSI report caused by the aperiodic CSI-RS is not included in the CSI process of the existing LTE specification. The CSI reporting mode caused by the aperiodic CSI-RS is based on the higher layer signaling of the serving BS, and may be configured as one of the aperiodic CSI reporting mode supported by the existing LTE specification.

The serving BS does not require the CSI trigger for the periodic CSI-RS and the CSI trigger for the aperiodic CSI-RS in a same UL subframe.

Figure 8:
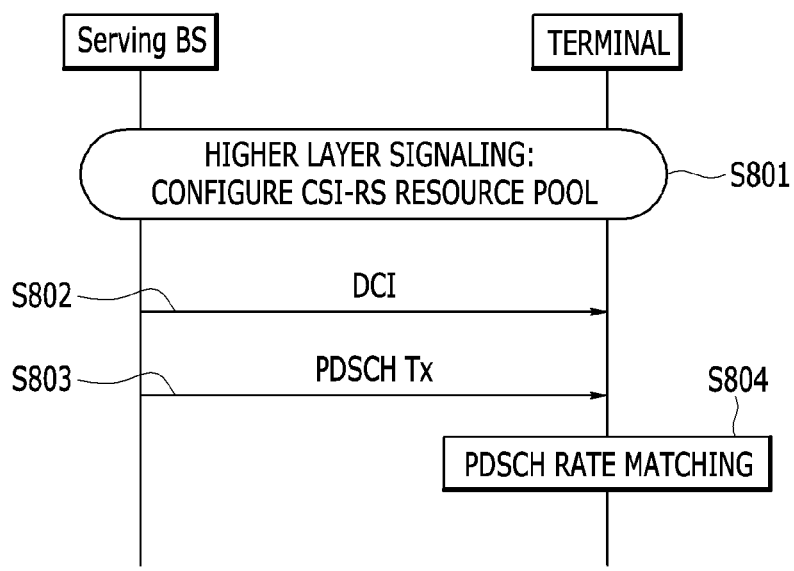
FIG. 8 is a flowchart illustrating a method for generating CSI report based on CSI-RS resource pool according to an exemplary embodiment.
Figure 9:
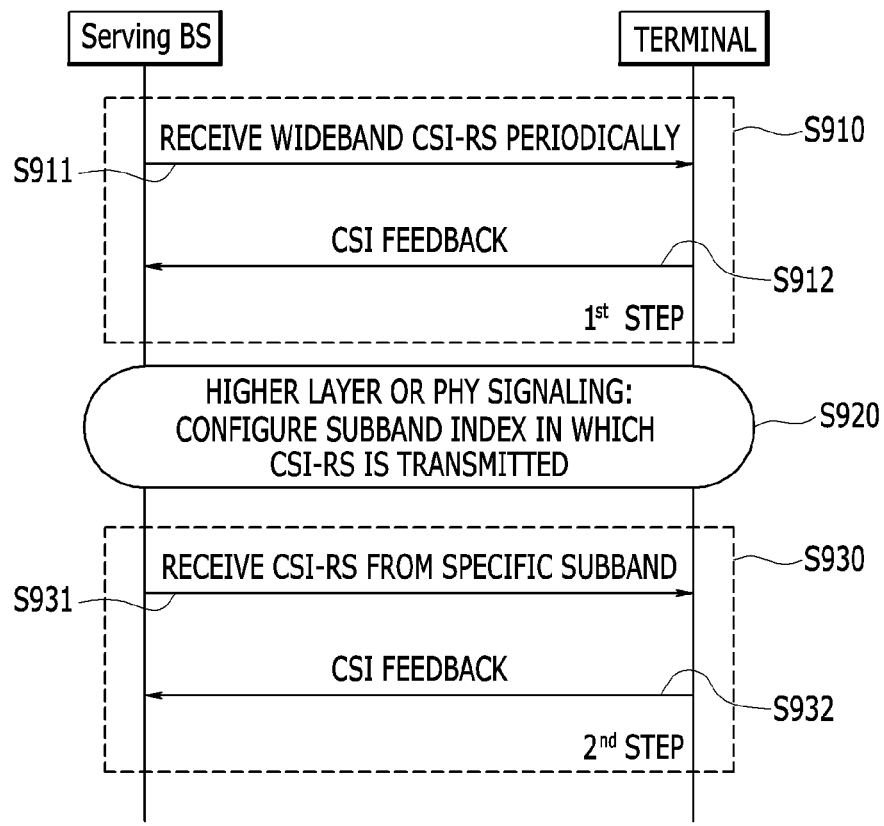
FIG. 9 is a flowchart illustrating a method for hybrid CSI-RS transmission according to an exemplary embodiment.

FIG. 8 is a flowchart illustrating a method for generating CSI report based on CSI-RS resource pool according to an exemplary embodiment.

According to an exemplary embodiment, the serving BS configures CSI-RS resource pool including a plurality of the NZP CSI-RS resource and a plurality of the ZP CSI-RS resource to the terminal (S801). The serving BS indicates the NZP CSI-RS resource and the ZP CSI-RS resource to the terminal by using an extra DCI. In this instance, the required specification for the indication of the NZP CSI-RS resource and the ZP CSI-RS resource includes the subband NZP CSI-RS resource and the subband ZP CSI-RS resource restricted in a specific subband. And the number of the CSI-RS port, p-C, and the CSI-RS sequence seed may be delivered to the terminal through the higher layer signaling. The terminal restricts the CSI-RS reference resource into the indicated subband, and generates the CSI report based on the received NZP CSI-RS in the indicated subband. In this instance, the extra DCI used by the serving BS includes at least one of CSI report trigger, an RB allocation or a subband index used as the CSI reference resource, an index of the NZP CSI-RS, or an index of the ZP CSI-RS. The CSI report may be generated based on the CSI-RS resource pool. When the CSI-RS resource pool is configured, an additional signaling directed to the terminal is needed. The CSI-RS resource pool may be defined in the wideband or the subband. The terminal assumes that the CSI-RS resource pool is periodically located in the wideband or the subband.

The serving BS configures the CSI-RS resource pool, which includes all NZP CSI-RS resource and all ZP CSI-RS resource that can be allocated potentially, to the terminal through the higher layer signaling. Afterwards, the serving BS transmits allocation information about the RB or the subband of the NZP/ZP CSI-RS resource, an index of the NZP/ZP CSI-RS resource, and the number of the CSI-RS port through the DCI to the terminal (S802). The terminal does not perform the CSI measurement after the configuration of the CSI-RS resource pool unless the DCI is not received. Therefore, after the CSI-RS resource pool is configured, the terminal assumes that the PDSCH is not included in the RE included in the CSI-RS resource pool, and performs the PDSCH rate matching (S803, S804).

According to the exemplary embodiment, the serving BS in which the elevation beamforming (EBF) of the LTE system may apply an antenna virtualization for each subband, and may indicate the CSI report to the terminal for each subband according to the antenna virtualization. In this instance, the serving BS may indicate an antenna virtualization change or beamforming change through the dynamic signaling. When the serving BS changes the antenna virtualization according to the pre-configured specification of the LTE system, an explicit signaling directed to the terminal is not needed because the terminal have already known the antenna virtualization changes.

The serving BS delivers information about a channel state information-interference measurement (CSI-IM) and a CSI-RS in which the antenna virtualization is valid. Here, the delivered information may include interference measurement time interval, signal measurement time interval, interference measurement subband, and signal measurement subband. The signal measurement time interval and the interference measurement time interval may be regulated through the higher layer signaling of the serving BS, or may be pre-determined by the specification. For the subband restriction, the serving BS may transmit the information about the subband in which the CSI-RS and the CSI-IM is valid (for example, the continuous RBs or the discontinuous RBs) through the higher layer signaling or the DCI to the terminal. An interference measurement window may be controlled through the higher layer signaling or the DCI. The RBs used by the terminal may be restricted according to the interference measurement window. In this instance, information about the interference measurement window may include the number of the subframes and the number of the RBs.

According to an exemplary embodiment, the serving BS indicates, to the terminal through the higher layer signaling, the subband in which the CSI report is transmitted. And the terminal assumes that the CSI-RS is transmitted in the indicated subband. The serving BS notifies a PUSCH resource configurations to the terminal through the DCI. In this instance, the existing DCI format 0 and 4 may be reused.

In the following, the transmission method of CSI-RS beamformed based on the EBF is described in detail.

The serving BS transmitting the beamformed CSI-RS based on the EBF, may use a plurality of beamformed CSI-RS resources. In this instance, a single CSI-RS resource, or plural CSI-RS resources, or all CSI-RS resources may be included in a single subframe. The serving BS configures a single CSI process for the entire beamformed CSI-RS, so that the terminal generates a CSI feedback by selecting the CSI-RS resource. Or the serving BS may configure the CSI process for each CSI-RS resource.

As the foregoing description, the antenna virtualization may be different from each subband. And the RI, the PMI, and the CQI may be different from each subband, and the Quasi-co-location may also be different from each subband. For example, according to the steering angle of the beamformed CSI-RS, a Doppler frequency may be measured differently to the terminal.

In this instance, a feedback of the wideband CSI commonly applied to the entire subband is not transmitted to the serving BS. Specifically, the terminal may obtain the RI, the wideband PMI, and the wideband CQI for each subband corresponding to the same CSI-RS resource index. However, because the subband PMI, the subband CQI, and the subband RI are applied to the scheduling, the information about the wideband is not needed. Therefore, terminal may reduce the feedback overhead by performing differential encoding with respect to a CSI, where the CSI is obtained from the specific subband (for example, an index of a first subband in which the same virtualization is applied or an index of a first subband regardless of the virtualization).

Meanwhile, the terminal may measure a high CQI from one CSI-RS resource of a plurality of beamformed CSI-RS resources transmitted for each subband by the serving BS. In this instance, the terminal transmits a feedback including a CSI and a preferred beam index determined for each subband, so that the serving BS may perform scheduling based on the feedback. The serving BS may require an extra CSI feedback (RI, CQI, PMI) for a subband set in which the same CSI-RS resource index is requested.

In a hybrid CSI-RS transmission scheme, the terminal receives the CSI-RS transmitted in two steps. In a first step, the terminal receives the wideband CSI-RS resource from the serving BS periodically (S910). And the serving BS transmits the CSI-RS resource. The terminal receives the CSI-RS periodically (S911), and performs feedback of CSI (for example, PMI, RI, PQI) periodically or according to the request of the serving BS (S912). In this instance, the serving BS may obtain a precoding, which is appropriate to the terminal transmitting the feedback, for each subband based on the CSI-RS feedback caused by the first step CSI-RS transmission. In order to reduce the CSI feedback overhead, the terminal may deliver a subband index, a PMI measured for each subband, and an RI measured for the wideband except the CQI to the serving BS. The subband index may be determined by the serving BS in an actual implementation, for example, the subband index is determined as the subband in which the CQI is measured more than the predetermined threshold. If a UE selection CSI reporting mode is set, the terminal may perform feedback including the PMI only, or both the PMI and the RI, except the CQI.

In a second step, the terminal receives the CSI-RS in a specific subband from the serving BS (S930). The serving BS does not use the entire subband, and transmits the CSI-RS by using the subband selected by the first step feedback, in order to reduce the overhead of the CSI-RS transmission. The beamforming weight may be determined through the UL measurement result based on the UL SRS when the first step feedback is available. The serving BS configures an index of the subband in which the subband CSI-RS is transmitted to the terminal through the higher layer signaling or the DCI (S920). In this instance, the CSI-RS resource index received by the terminal in the second step may be same or different as the CSI-RS resource index received in the first step. The number of the CSI-RS port may also be same or different as that of the first step. The terminal receives the CSI-RS aperiodically (S931), and performs the CSI feedback (S932).

Figure 10:
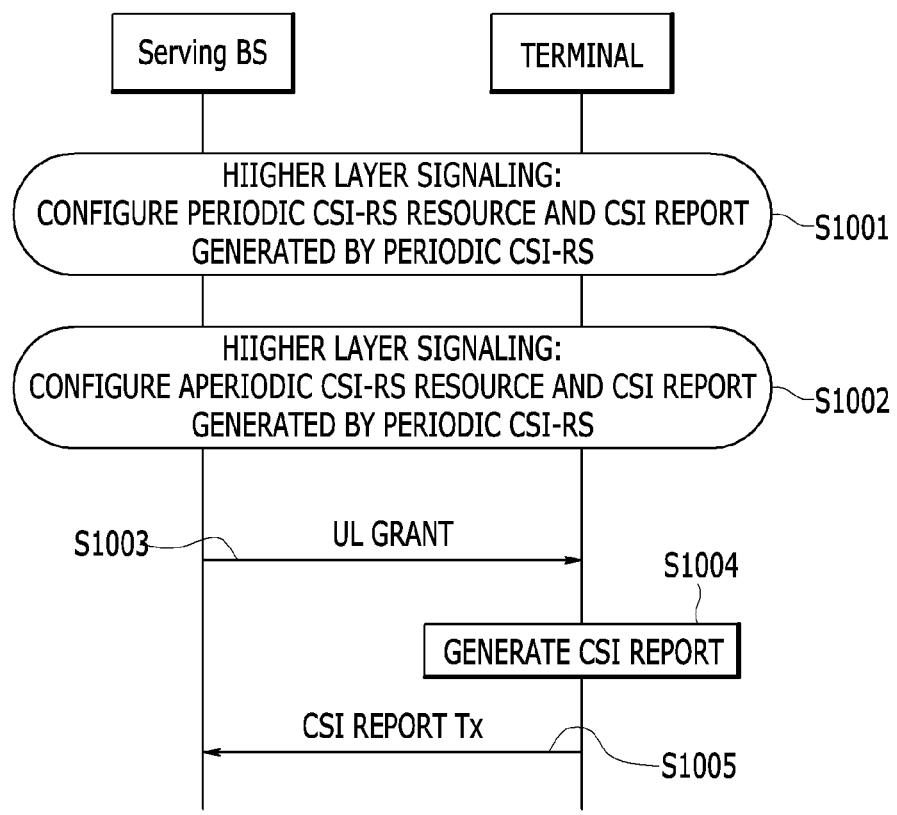
FIG. 10 is a flowchart illustrating a method for generating CSI report for high resolution PMI report according to an exemplary embodiment.

FIG. 10 is a flowchart illustrating a method for generating CSI report for high resolution PMI report according to an exemplary embodiment.

According to an exemplary embodiment, the serving BS indicates legacy CSI report to the terminal (S1001), and indicates a CSI report (including RI, PMI, CQI, and so on) for the specific subband to the terminal (S1002). In this instance, the number of the CSI-RS port, a p-C, a CSI-RS sequence seed may be transmitted to the terminal through the higher layer signaling. The subband in which the CSI-RS is transmitted may be indicated to the terminal through the higher layer signaling or the DCI. The subband indication through the higher layer signaling and the subband indication through the DCI are based on the foregoing method.

The serving BS indicates the CSI report to the terminal by using the UL grant only, or both the DL grant and the UL grant (S1003). When the subband is indicated through the DCI, the terminal may be notified the aperiodic CSI-RS transmission, the subband in which the CSI-RS is transmitted, and the location of the PUSCH resource for transmitting the CSI report from the UL grant. When the subband is indicated through the higher layer signaling, the terminal may be notified the aperiodic CSI-RS transmission and the location of the PUSCH resource for transmitting the CSI report.

Meanwhile, a high resolution PMI report may be used to accurately obtain the CSI for the specific subband, and be utilized in multi user (MU) pairing for an MU MIMO. In this instance, a single user PMI codebook (SU PMI codebook) and a MU PMI codebook may be predetermined. For example, the SU PMI codebook is an oversampled discrete Fourier transform (DFT) codebook by x, and the MU PMI codebook is an oversampled DFT codebook by y (y>x). A plurality of PMI codebooks is configured through the higher layer signaling, and the BS may require the CSI report to the terminal through the DCI by using the specific PMI codebook. In this instance, each PMI codebook is based on the DFT PMI codebook, and may be presented by the oversampling rate, the number of the linear combination, and the number of the PMI.

For the full power utilization, when the number of the CSI-RS port for the specific subband is different each other, an energy per resource element (EPRE) of the CSI-RS represented by the p-C may be configured for each subband. For example, when eight CSI-RS ports are configured for the RB1 and the four CSI-RS ports are configured for the RB2, if a PDSCH in which the same precoding is applied is transmitted in the RB1 and the RB2, the terminal may determine the same PDSCH EPRE, but may determine the CSI-RS EPRE differently for each RB. To solve this problem, the serving BS may use an extra DCI format. The required information in this case includes at least one of an RB allocation or subband index where the RB or the subband is used for the CSI reference resource, PMI codebook indication (for example, 1 bit), or parameter set index for a codebook configuration (for example, the oversampling rate, the number of the linear combination, etc.).

In the following, the MU CSI report is described in detail. The MU CSI report of the MU CSI may be configured when the aperiodic CSI-RS and its CSI report is configured in S1002.

The terminal may transmit a plurality of the PMIs and CQIs (MU CSI) for each subband as information for the MU pairing to the serving BS. However, because the CSI payload may increase rapidly when the terminal delivers the MU CSI for each subband, the periodic CSI reporting mode using the PUCCH is not appropriate. Therefore the terminal uses the PUSCH for delivering the MU CSI, and a new PUSCH CSI reporting mode may be introduced.

The serving BS may indicate an MU CSI report for the specific subband to the terminal through the DCI. In this instance, the MU CSI and the SU CSI may be defined in each bit field, separately. Or the serving BS may assign a codebook for the specific subband through the higher layer signaling to the terminal, in this case the terminal generates the CSI feedback as the number of the codebook for the specific subband.

According to an exemplary embodiment, the terminal assumes that the CSI-RS is transmitted in a restricted subband, and may generate the plurality of PMIs and CQIs for a single subband. The PMI for each subband may be a precoder generated based on the single user hypothesis, or may be a precoder generated based on the multi user hypothesis. In the single user hypothesis, the terminal assumes that the PDSCH is transmitted from the serving BS to the terminal, however, in the multi user hypothesis, the terminal assumes that a plurality of PDSCHs is transmitted from the serving BS in a same time/frequency resource by scheduling a plurality of terminals simultaneously (MU pairing). When the 2-dimensional PMI codebook is used in the single user hypothesis, a PMI vector may be generated by each vertical axis and the horizontal axis and a PMI matrix or a plurality of PMI matrix may be generated. The MU pairing considered in the MU hypothesis may be configured through the higher layer signaling, as the definition of the specification, or by restricting the combination defined in the specification through the higher layer signaling. The MU hypothesis may include a plurality of MU pairing, and the terminal may calculate a precoding because a 1-dimensional PMI codebook or the 2-dimensional PMI codebook is applied for each MU pairing.

When the single user hypothesis is applied and the 2-dimensional PMI codebook is applied, one CQI from the subband may be obtained from each vertical axis and horizontal axis. Or one CQI including information of the vertical axis and the horizontal axis may be obtained. When the 1-dimensional PMI codebook is applied, one CQI is obtained. When the multi user hypothesis is applied, the CQI is obtained for each MU pairing. The number of the CQI obtained in this case may be different according to the dimension of the PMI codebook. For example, when the 1-dimensional PMI codebook is applied, the number of the subband CQI is based on the number of the MU pairing. When the 2-dimensional PMI codebook is applied, the number of the subband CQI is based on the product of number of the MU pairing and the number of the CQI obtained from the 2-dimensional PMI codebook.

The terminal may not transmit a feedback of predetermined PMI set (that is, the multi user hypothesis is applied in specification) in order to reduce the CSI feedback. In this case the terminal may only transmit the feedback of the CQI. And, one CQI or two CQI may be generated for each PMI included in a PMI set. The number of the bit may be reduced by using a differential CQI for a basis CQI as the CQI. In this case, the basis CQI may be an arbitrary CQI included in the MU CSI report. Or, the basis CQI may be a CQI obtained from the wideband by the terminal or determined value from the calculation (for example, an arithmetic mean) of the subband CQI obtained in the subband by the terminal.

According to the exemplary embodiment in the present description, the subband CSI report is required to the terminal by transmitting the reference signal (UE-RS or CSI-RS) by the unit of the subband, so that the payload of the CSI report can be reduced. In addition, the plurality of the CQIs and the PMIs may be obtained from the specific subband with maintaining the existing specification of wireless communication network. Here, the RS is transmitted by the unit of the subband, so that the plurality of the RS can be multiplexed (frequency division multiplexing, FDM) in a subframe. That is, the terminal may reduce the payload of the CSI report through the subband CSI report, and multiplex the plurality of the RS in a subframe.

Figure 11:
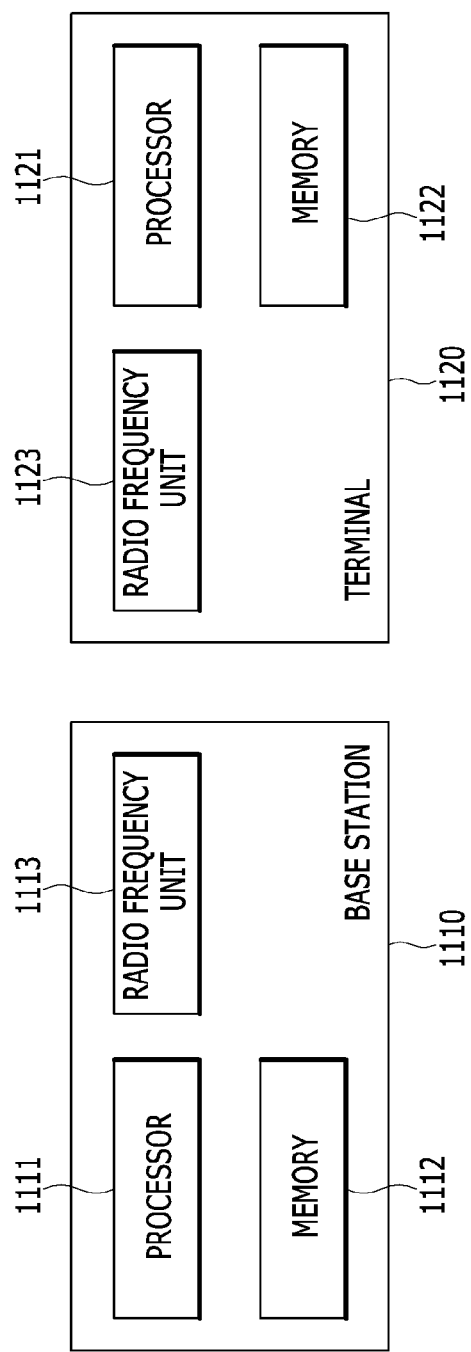
FIG. 11 is a block diagram illustrating a wireless communication system according to an exemplary embodiment.

FIG. 11 is a block diagram illustrating a wireless communication system according to an exemplary embodiment.

Referring to FIG. 11, the wireless communication system according to an exemplary embodiment includes a base station 1110 and a terminal 1120.

The base station 1110 includes a processor 1111, a memory 1112, and a radio frequency (RF) unit 1113. The memory 1112 may be connected to the processor 1111, and may store various kinds of information for driving the processor 1111 or at least one program performed by the processor 1111. The radio frequency unit 1113 may be connected to the processor 1111 and may transmit/receive a radio signal. The processor 1111 may realize a function, a process, or a method proposed by an exemplary embodiment of the present invention. In this instance, in the wireless communication system according to an exemplary embodiment, a wireless interface protocol layer may be realized by the processor 1111. An operation of the base station 1110 according to an exemplary embodiment may be realized by the processor 1111.

The terminal 1120 includes a processor 1121, a memory 1122, and a radio frequency unit 1123. The memory 1122 may be connected to the processor 1121, and may store various kinds of information for driving the processor 1121 or at least one program performed by the processor 1121. The radio frequency unit 1123 may be connected to the processor 1121 and may transmit/receive a radio signal. The processor 1121 may realize a function, a process, or a method proposed by an exemplary embodiment of the present invention. In this instance, in the wireless communication system according to an exemplary embodiment, a wireless interface protocol layer may be realized by the processor 1121. An operation of the terminal 1120 according to an exemplary embodiment may be realized by the processor 1121.

In an exemplary embodiment of the present invention, the memory may be provided inside or outside the processor, and the memory may be connected to the processor by using various means known to a person skilled in the art. The memory is a volatile or non-volatile storage medium in various formats, and for example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for receiving a reference signal (RS) from a base station by a terminal, comprising:
    receiving configuration information about a first subband of subbands to which the RS is allocated from the base station through a higher layer signaling, wherein each subband includes at least one resource block (RB) and the subbands include a second subband to which the RS is not allocated;
    receiving the RS based on the configuration information; and
    transmitting channel state information (CSI) report, which is generated based on the RS, to the base station by using an uplink resource indicated by an uplink grant (UL grant),
    wherein the RS is one of a user equipment-reference signal (UE-RS) or a channel state information-reference signal (CSI-RS).

2. The method of claim 1, wherein the first subband includes at least one zero power (ZP) CSI-RS resource and at least one non-zero power (NZP) CSI-RS resource when the RS is the CSI-RS.

3. The method of claim 2, further comprising: receiving information about the first subband through the higher layer signaling, wherein the information about the first subband is an index of the first subband to which the NZP CSI-RS resource is allocated.

4. The method of claim 2, further comprising: receiving information about the first subband through downlink control information (DCI), wherein the information about the first subband is an index of the first subband to which the NZP CSI-RS resource is allocated.

5. The method of claim 2, further comprising: receiving a downlink grant (DL grant) including a physical downlink shared channel (PDSCH) scheduling information for a rate matching of the PDSCH; and performing the rate matching in consideration of a location of a resource element (RE) used by the NZP CSI-RS.

6. The method of claim 2, further comprising: performing a rate matching for an enhanced physical downlink control channel (EPDCCH) based on a subframe including the subbands when the base station performs a rate matching on a resource block in which the EPDCCH is transmitted.

7. The method of claim 1, wherein the UL grant includes a CSI trigger for the CSI report.

8. A method for rate matching for a physical downlink shared channel (PDSCH) by a terminal, comprising:
    acquiring configuration information about subbands through a PDSCH resource element (RE) mapping and quasi-co-location indicator (PQI) field at which a location of a reference signal (RS) is considered; and
    performing the rate matching based on the PQI field, wherein each subband of the subbands includes at least one resource block (RB), a first subband of the subbands includes the RS, and a second subband of the subbands does not include the RS.

9. The method of claim 8, further comprising: receiving a downlink grant (DL grant) including a scheduling information for the PDSCH, wherein the performing of the rate matching comprises performing the rate matching based on the scheduling information and the PQI field.

10. The method of claim 8, wherein the performing of the rate matching comprises performing the rate matching in the same manner for a resource block (RB) to which the PDSCH is allocated.

11. A terminal comprising:
at least one processor; a memory; and a radio frequency unit, wherein the at least one processor executes at least one program stored in the memory to perform;
receiving configuration information about a first subband of subbands to which a reference signal (RS) is allocated from a base station through a higher layer signaling, wherein each subband includes at least one resource block (RB) and the subbands include a second subband to which the RS is not allocated;
receiving the RS based on the configuration information; and
transmitting channel state information (CSI) report, which is generated based on the RS, to the base station by using an uplink resource indicated by an uplink grant (UL grant),
wherein the RS is one of a user equipment-reference signal (UE-RS) or a channel state information-reference signal (CSI-RS).

12. The terminal of claim 11, wherein the UL grant includes a CSI trigger for the CSI report.

13. The terminal of claim 11, wherein the first subband includes at least one zero power (ZP) CSI-RS resource and at least one non-zero power (NZP) CSI-RS resource when the RS is the CSI-RS.

14. The terminal of claim 13, wherein at least one processor further performs receiving information about the first subband through the higher layer signaling, wherein the information about the first subband is an index of the first subband to which the NZP CSI-RS resource is allocated.

15. The terminal of claim 13, wherein at least one processor further performs receiving information about the first subband through a downlink control information (DCI), wherein the information about the first subband is an index of the first subband to which the NZP CSI-RS resource is allocated.

16. The terminal of claim 13, wherein at least one processor further performs: receiving a downlink grant (DL grant) including a physical downlink shared channel (PDSCH) scheduling information for a rate matching of the PDSCH; and performing the rate matching in consideration of a location of resource element (RE) used by the NZP CSI-RS.

17. The terminal of claim 13, wherein at least one processor further performs performing a rate matching for an enhanced physical downlink control channel (EPDCCH) based on a subframe including the subbands when the base station performs a rate matching on a resource block in which the EPDCCH is transmitted.

* * * * *